(No Model.)

A. DOMEIER & O. C. HAGEMANN.
APPARATUS FOR TREATING SOAP LYE.

No. 413,618. Patented Oct. 22, 1889.

UNITED STATES PATENT OFFICE.

ALBERT DOMEIER AND OTTO CHRISTIAN HAGEMANN, OF LONDON, ENGLAND, ASSIGNORS TO JAMES S. KIRK & CO., OF CHICAGO, ILLINOIS.

APPARATUS FOR TREATING SOAP-LYES.

SPECIFICATION forming part of Letters Patent No. 413,618, dated October 22, 1889.

Application filed December 21, 1888. Serial No. 294,309. (No model.)

*To all whom it may concern:*

Be it known that we, ALBERT DOMEIER, merchant, and OTTO CHRISTIAN HAGEMANN, chemical engineer, residing at London, England, have invented certain new and useful Improvements in Apparatus for Obtaining Salt and Crude Glycerine from Spent Soap-Lye, of which the following is a specification.

In the manufacture or recovery of crude glycerine from spent soap-lye there is deposited or thrown out of solution during the process of concentration a considerable quantity of common salt. Such salt is liable to cake or burn on the surface of the pans, tanks, or other vessels employed, thus deteriorating the quality of both the salt and crude glycerine.

The object of this invention is to overcome such caking or burning and to facilitate the removal of said salt as formed.

In the accompanying drawings, forming a part of this specification, we have illustrated an apparatus adapted to the carrying out of our invention.

Figure 1:
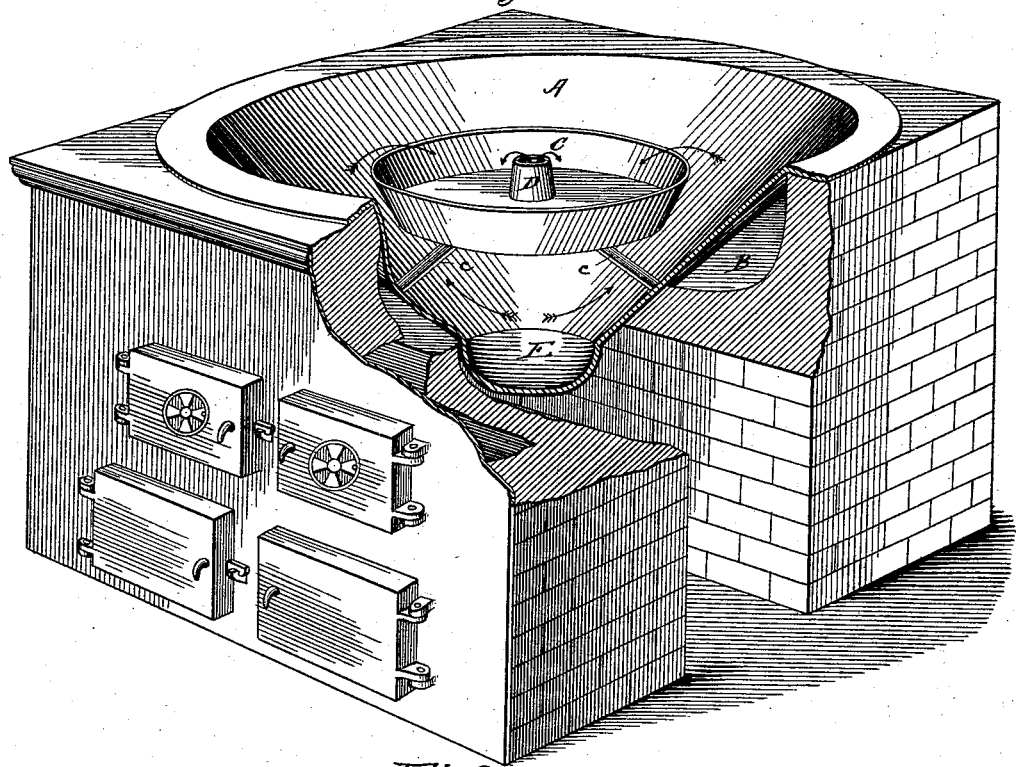
Figure 2:
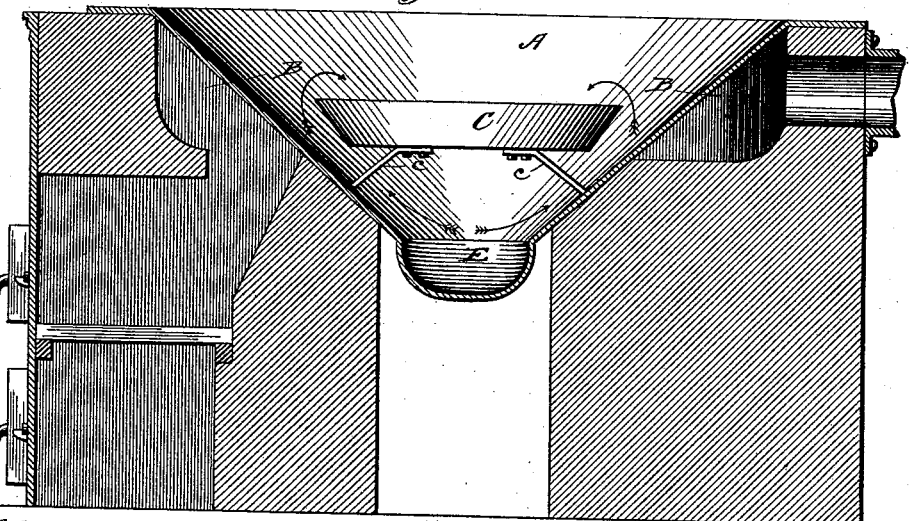

In said drawings, Figure 1 is a perspective view, partly in broken section, of said apparatus; and Fig. 2 is a vertical section.

The apparatus illustrated in the drawings comprises a metallic evaporating-pan A, which is set in the brick-work of a suitable furnace, the heat from which passes by preference through a suitable flue, as B, around the sides of the pan. Instead of this method of heating, the pan may be jacketed and heated by steam, superheated steam, or hot air.

C is a second metallic pan or vessel, smaller and shallower than pan A, and within which it is supported upon legs c, as shown, or it may be suspended centrally within pan A, so as to clear the walls thereof, but in such position that it is submerged when pan A is filled. Pan C is provided, preferably, with a central pipe D, and pan A is provided, preferably, with the pocket E in its bottom.

In operation we fill the pan A with the spent soap-lye to be concentrated, thus submerging the inner vessel, and apply heat to the sides of the outer vessel. This causes boiling to commence at the sides of said outer vessel, and the water passes off into the atmosphere in the form of steam, while the salt formerly in solution crystallizes. As the ebullition is most violent at the circumference of the liquid body, the movement of the liquid, as well as of the crystalline product, will be toward the center of the apparatus. One result of this action is that the salt formed during the operation is prevented from settling on or incrusting the sides of the pan. Another result is that the salt as formed is deposited by gravity in the central pan or vessel, wherein it remains without burning or caking until it is convenient to remove it. Where the pipe D is employed, there will be a movement of the boiling liquid upward through said pipe, and the deposit of the salt will be facilitated.

The purpose of the pocket E is to collect any salt that may escape deposit in the central pan.

We do not limit our invention to the use of the pipe D or the pocket E, or to any particular method of heating or supporting the pans, or to any particular shape or proportions of parts, the gist of our invention being particularly pointed out in our claims.

We have indicated by arrows on the drawings the direction of movement of the liquor under the action of the heat.

Having thus described our invention, what we claim as new, and desire to secure by Letters Patent, is—

1. In an apparatus for the recovery of salt from spent lye, the combination of an open vessel to contain the lye and a heating means exterior to said vessel and adapted to heat the same and an inner and smaller deposit-vessel having an imperforate peripheral wall and bottom located within the first to receive and retain the salt or other solid deposit, substantially as described.

2. In an apparatus for the recovery of salt from spent lye, comprising in combination an outer vessel to contain the lye and means for applying heat thereto and an inner vessel smaller than and supported within the first for the reception of the salt or other deposit, said outer vessel being provided with a pocket, substantially as and for the purpose set forth.

3. In an apparatus for the recovery of salt from spent soap-lye, the combination, with an outer vessel to contain the lye and means for heating the same, of an inner vessel wherein to collect the salt or other deposit, said inner vessel having a central pipe, substantially as described.

ALBERT DOMEIER.
OTTO CHRISTIAN HAGEMANN.

Witnesses:
 MARTIN B. WALLER,
 *Vice Consul-General, U. S. A., London.*
 A. G. MOSSARD.